(12) United States Patent
Lyon et al.

(10) Patent No.: US 9,394,106 B2
(45) Date of Patent: Jul. 19, 2016

(54) RACK TYPE PIPE FEEDER FOR A PIPE FUSION MACHINE

(71) Applicant: McElroy Manufacturing, Inc., Tulsa, OK (US)

(72) Inventors: Timothy A. Lyon, Claremore, OK (US); Thomas D. Cravens, Pryor, OK (US)

(73) Assignee: McElroy Manufacturing, Inc.

( * ) Notice: Subject to any disclaimer, the term of this patent is extended or adjusted under 35 U.S.C. 154(b) by 0 days.

(21) Appl. No.: 14/541,318

(22) Filed: Nov. 14, 2014

(65) Prior Publication Data

US 2015/0071753 A1    Mar. 12, 2015

Related U.S. Application Data (63) Continuation of application No. 12/283,391, filed on Sep. 11, 2008, now abandoned, which is a continuation-in-part of application No. 11/518,052, filed on Sep. 8, 2006, now Pat. No. 8,464,410.

(51) Int. Cl.
*B66F 11/00* (2006.01)
*B65G 1/08* (2006.01)

(52) U.S. Cl.
CPC .......... *B65G 1/08* (2013.01); *B65G 2201/0217* (2013.01); *B65G 2201/0276* (2013.01)

(58) Field of Classification Search
CPC .... B21D 43/006; B23Q 7/055; B02C 17/205; E21B 19/155; B23P 19/024; B65G 47/54; B65G 47/57; B65G 39/02; B65G 13/11; B65G 39/09; B65G 1/08; B65G 2201/0217; B65G 2201/0276; B07C 5/362; B21J 15/46; B25B 27/00; B25B 27/06; A47C 3/30; F16M 11/12; F16M 11/04

See application file for complete search history.

(56) References Cited

U.S. PATENT DOCUMENTS

| | | |
|---|---|---|
| 2,436,499 A | 2/1948 | Williams |
| 2,472,654 A | 6/1949 | Engelke |
| 2,705,119 A | 3/1955 | Ingwer |
| 2,733,330 A | 1/1956 | Blewett |
| 3,129,805 A | 4/1964 | Krahn et al. |
| 3,178,146 A | 4/1965 | Goodale |
| 3,254,776 A | 6/1966 | Brown |
| 3,313,505 A | 4/1967 | Petrie |
| 3,741,509 A | 6/1973 | Kelly |
| 3,787,039 A | 1/1974 | Zeichman |
| 3,792,783 A | 2/1974 | Brown |
| 3,916,500 A | 11/1975 | Brown |
| 4,067,450 A | 1/1978 | Birdwell |
| 4,193,486 A | 3/1980 | Borzym et al. |
| 4,520,981 A | 6/1985 | Harrigan |

(Continued)

*Primary Examiner* — Stephen Vu
(74) *Attorney, Agent, or Firm* — Frank J. Catalano; Gable Gotwals (57) ABSTRACT

A rack feeds sticks of pipe to a machine for serial fusion to the trailing end of a pipeline. Multiple independent spaced apart feeders support transverse bundles of sticks of pipe on beams. Legs which support the beams above the ground have jacks to vary the height and slope of the beams. The slope is set so that sticks tend to roll toward the lower front end of the beam where roller assemblies receive the sticks of pipe as they are manually rolled, one at a time, off the beams. All of the rack components are modular and interchangeably connectable so that the feeder can be quickly adapted for a variety of conditions and applications. The level of the lead end of the pipe can be hydraulically adjusted for vertical orientation with the fusion machine and the pipe fed on by hydraulically powered roller to provide a single operator system.

4 Claims, 8 Drawing Sheets

(56) References Cited

U.S. PATENT DOCUMENTS

| | | |
|---|---|---|
| 4,697,446 A | 10/1987 | Yamamoto et al. |
| 5,064,156 A | 11/1991 | Handler et al. |
| 5,102,286 A | 4/1992 | Fenton |
| 5,297,779 A | 3/1994 | Collins, Jr. et al. |
| 5,337,875 A | 8/1994 | Lee |
| 5,358,371 A | 10/1994 | Neddo |
| 5,711,358 A | 1/1998 | Willis |
| 5,901,935 A | 5/1999 | Lai |
| 5,934,626 A | 8/1999 | Collins, Jr. |
| 6,461,255 B1 | 10/2002 | Smith |
| 6,575,213 B1 | 6/2003 | Houk |
| 6,612,533 B2 | 9/2003 | Biles et al. |
| 6,719,515 B2 | 4/2004 | Tolman et al. |
| 6,988,719 B2 | 1/2006 | Ursell et al. |
| 7,240,885 B1 | 7/2007 | Sullivan |
| 7,240,886 B2 | 7/2007 | Jones |
| 7,363,991 B2 | 4/2008 | Baer |
| 7,736,119 B2 | 6/2010 | Belik |
| 2006/0000462 A1 | 1/2006 | Kurtz, Jr. |

RACK TYPE PIPE FEEDER FOR A PIPE FUSION MACHINE

PRIORITY CLAIM

This application is a continuation of U.S. patent application Ser. No. 12/283,391 filed Sep. 11, 2008 (which has been abandoned on Nov. 28, 2014), which is a continuation-in-part of U.S. patent application Ser. No. 11/518,052, filed Sep. 8, 2006, issued as U.S. Pat. No. 8,464,410 on Jun. 18, 2013.

BACKGROUND OF THE INVENTION

This invention relates generally to high density polyethylene (HDPE) pipe fusion equipment and more particularly concerns equipment for feeding sticks of pipe into a machine for fusion to the trailing end of a pipeline.

Handling and staging sticks of pipe to be fed into a pipe fusion machine are presently labor intensive, time consuming tasks requiring use of expensive pipe loading, unloading and manipulating equipment and causing extensive downtime of the fusion machine while each stick of pipe is maneuvered into the machine and of the peripheral equipment while the fusion machine is in operation.

Typically, heavy construction equipment, such as telehandlers, backhoe loaders and fork trucks, are used to handle the sticks of pipe. Some pipe stands are available for use in the pipe fusion process, but they hold only one stick of pipe at a time and, despite use of the stand, other jobsite equipment is still required to load and position each and every stick of pipe in the fusion machine. More recently, a pipe storage rack has been combined with a single pipe stand, making it easier to load sticks of pipe onto the stand. It is not, however, an effective tool for manipulating sticks of pipe into a fusion machine. Furthermore, because of the pipe size, terrain contour and pipe loading limitations of this combination, there are many applications in which it is of little use at all.

It is, therefore, an object of this invention to provide a rack type pipe feeder for a pipe fusion machine which can stage multiple sticks of pipe. Another object of this invention is to provide a rack type pipe feeder for a pipe fusion machine which eliminates the need for dedicated heavy equipment to handle each individual stick of pipe. It is also an object of this invention to provide a rack type pipe feeder for a pipe fusion machine which requires heavy equipment only for the purpose of loading bundles of pipe from a truck onto the feeder. Still another object of this invention is to provide a rack type pipe feeder for a pipe fusion machine which is adjustable to accommodate variations in terrain contour. A further object of this invention is to provide a rack type pipe feeder for a pipe fusion machine which is usable with fusion machines of various sizes. Yet another object of this invention is to provide a rack type pipe feeder for a pipe fusion machine which usable with pipes of various sizes. An additional object of this invention is to provide a rack type pipe feeder for a pipe fusion machine which feeds pipe smoothly into a pipe fusion machine. And it is an object of this invention to provide a rack type pipe feeder for a pipe fusion machine which facilitates easy pulling of pipe through the jaws of the fusion machine into alignment for fusion with next stick of pipe.

SUMMARY OF THE INVENTION

In accordance with the invention, a rack type pipe feeder is provided for use in feeding sticks of pipe to a machine for serial fusion to the trailing end of a pipe. Multiple independent feeders are spaced apart to support bundles of sticks of pipe.

Each feeder has a beam for supporting transversely disposed sticks of pipe. Legs proximate front and rear ends of the beam support the beam above the ground. A jack is used to vary the height of one of the legs so as to set a beam slope at which the transverse sticks of pipe tend to roll toward the lower front end of the beam. Preferably, each leg has a jack.

A roller assembly at the lower end of the beam has a roller aligned for rotation about an axis parallel to the beam. The roller is positioned to receive a stick of pipe as it rolls off the lower front end of the beam.

Preferably, the beam, the legs and the roller assemblies are modular and each leg has a coupling assembly which is co-operable with coupling assemblies on the beam and the roller assemblies to engage the legs to the beam and a roller assembly to either leg. In a preferred leg coupling assembly, an integral pair of J-hooks is aligned back-to-back on a vertical axis of symmetry. Each hook has an upper aperture through it. The coupling assemblies on the beam and roller assembly are substantially the same in configuration. They each have an extending fixed lower pin which can be seated in the bottom of its respective one of the J-hooks, an upper aperture oriented for alignment with the aperture of their respective one of the J-hooks when the lower pin is seated in its respective J-hook and a pin which is manually insertable into and withdrawable from aligned ones of the apertures to lock the legs to the beam and the roller assembly to the front leg.

Most preferably, each leg coupling assembly has a pair of spaced apart plates so that one end of the beam and one side of the roller assembly can be inserted between the plates on opposite sides of the leg. Each plate has an integral pair of apertured J-hooks aligned back-to-back on a vertical axis of symmetry. The beam and roller assembly coupling assemblies each have axially aligned pairs of fixed pins and upper apertures for engagement with their respective J-hooks. A single pin can be inserted through pairs of aligned apertures to lock its leg to its respective beam or roller assembly.

The modular beams may be trusses. A visible level may be fixed to the beam to facilitate setting the slope of the beam. A vertical post may be extended upwardly from a rear portion of the beam to limit rearward roll of sticks of pipe resting transversely on the beam. The post may be interchangeably insertable into one of two receptacles fixed at each end to the beam for receiving and securing the post in its upward orientation relative to the beam.

The roller of each roller assembly is preferably V-tapered to assure stability of the stick of pipe on the rollers. A member may be fixed to the roller assembly forward of the roller to block forward discharge of a stick of pipe from the roller. The blocking member may be a forwardly upwardly angled member. A lever may be pivotally engaged on the roller assembly to raise the roller supporting the stick of pipe, thereby facilitating further maneuverability of the stick of pipe into the fusion machine.

In operation, a plurality of independent pipe racks, usually three such racks, are aligned to support a traversing plurality of sticks of pipe. The heights of the racks are adjusted by use of the jacks to position their rollers to support a received stick of pipe at a level coordinated to the operation of the fusion machine and with the rack beams on slopes which extend upwardly from their rollers at angles at which said sticks of pipe tend to roll toward the rollers. At least one stick of pipe is transversely loaded on the racks. Preferably, loading is accomplished by resting one or more strapped bundles of sticks of pipe on the racks and then cutting the straps. A loaded stick of pipe is then manually urged to roll down the rack slopes onto the rollers. The end of the loaded stick of pipe closest to the fusion machine can be raised slightly, if necessary, using the lever, to properly align the stick with the fusion machine. The loaded stick can then be manually rolled on the rollers into the fusion machine. After the leading end of the manually rolled stick of pipe is fused to the trailing end of the pipeline, the pipeline can be pulled until the trailing end of the fused stick of pipe is positioned for fusion by the fusion machine to the next stick of pipe. The operation is then repeated beginning with the step of manually urging a loaded stick of pipe to roll down the rack slopes onto the rollers.

In another embodiment of the front leg and roller assembly, the roller is journalled for rotation about its longitudinal axis and is contoured to align a pipe resting on the roller for lengthwise travel in a direction transverse to the axis of roller. However, in this embodiment, the axis of rotation of the roller can be hydraulically raised and lowered while the pipe is resting on the roller. A frame has a pivotally connected arm supporting the roller in a horizontal orientation at a radial distance from the frame. A piston and cylinder are connected between pivotal joints on the frame and the arm. The piston and cylinder are hydraulically actuated to pivot the arm up or down so as to orient the pipe for entry into the pipe intake opening of the fusion machine.

In the preferred configuration of this embodiment, the frame pivotally supports a yoke and the yoke rotates about a horizontal axis. The frame is adapted at one end to be free standing and at its other end to be connected to the pipe discharge end of the storage rack. The roller is journalled about its longitudinal axis in the yoke at a radial distance from the horizontal axis of the yoke. The roller is oriented to receive and support a pipe rolling off the pipe discharge end of the storage rack and is contoured to align the pipe received on the roller for lengthwise travel in a direction transverse to the roller rotational axis. The piston and cylinder are connected between pivotal joints on the frame and the yoke. The piston and cylinder are hydraulically actuated to pivot the yoke up or down so as to orient the pipe for entry into the pipe intake opening of the fusion machine.

A drive may also be used to rotate the roller to cause the pipe resting on the roller to travel toward or away from the pipe intake opening of the fusion machine. The drive may be a hydraulic motor and may use the same hydraulic source as the level adjusting piston and cylinder. This source may be the hydraulic source of the pipe fusion machine. A single hydraulic control circuit can be used for both the level adjustment piston and cylinder and the pipe travel drive motor.

BRIEF DESCRIPTION OF THE DRAWINGS

Other objects and advantages of the invention will become apparent upon reading the following detailed description and upon reference to the drawings in which.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

The Feeder

Figure 1:
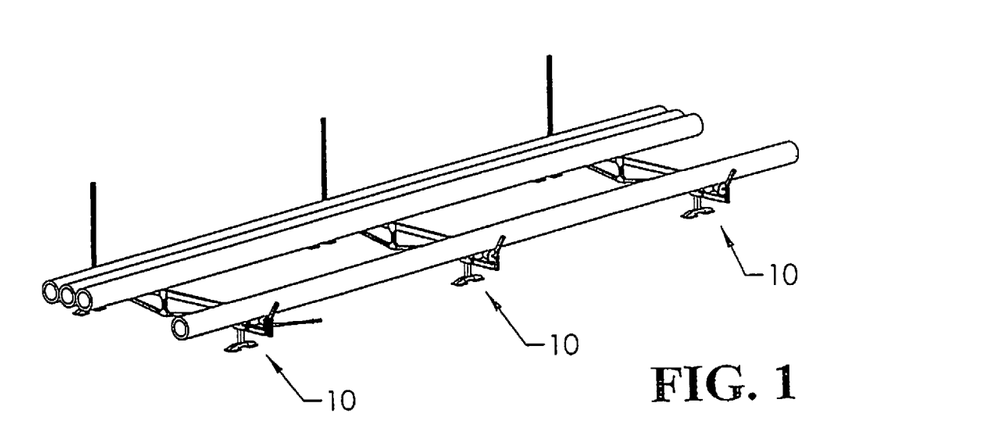
FIG. 1 is a perspective view of a multiple rack feeder supporting a load of sticks of pipe.

Turning to FIG. 1, a rack type pipe feeder 10 is provided for use in feeding sticks of pipe P to a machine (not shown) for serial fusion to the trailing end of a pipeline (not shown). In the use illustrated, three independent rack type feeders 10 are spaced apart to support bundles of the sticks of pipe P. One of the rack type feeders 10 illustrated in FIG. 2. The feeder 10 has a beam 20 for supporting the transversely disposed sticks of pipe P, legs 40 which support the beam 20 above the ground, a roller assembly 70 positioned to receive a stick of pipe P as it rolls off the beam 20 and coupling assemblies 100 to engage the legs 40 to the beam 20 and, depending on the configuration of the feeder 10, to a roller assembly 70. Preferably, the beam 20, the legs 40, the roller assemblies 70 and the couplings 100 are modular so that the feeder 10 has fewer different components and greater flexibility in configuration.

The Beam

Figure 2:
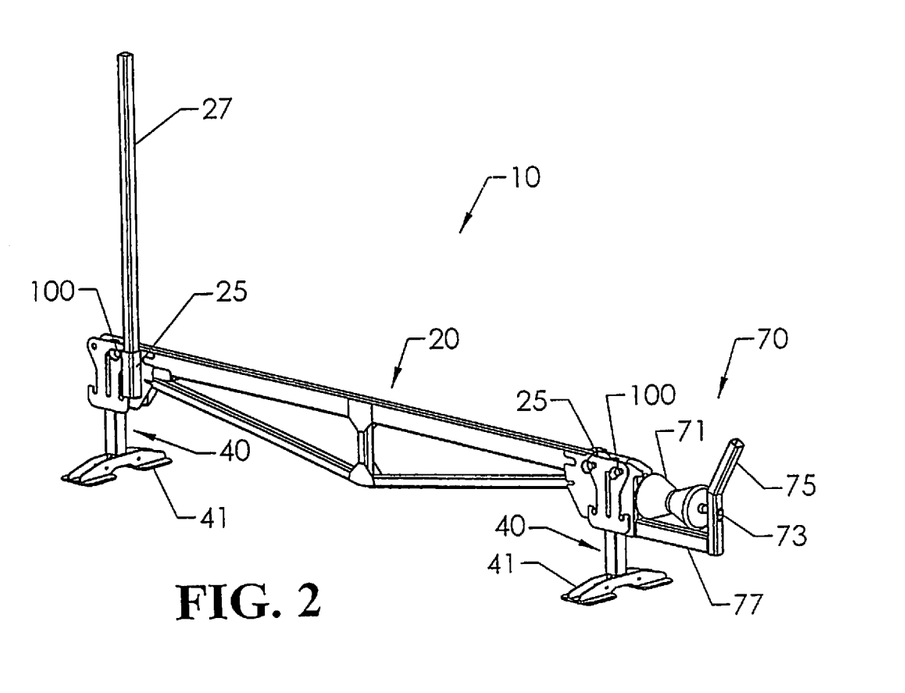
FIG. 2 is a perspective view of one of the racks of the feeder of FIG. 1.
Figure 3:
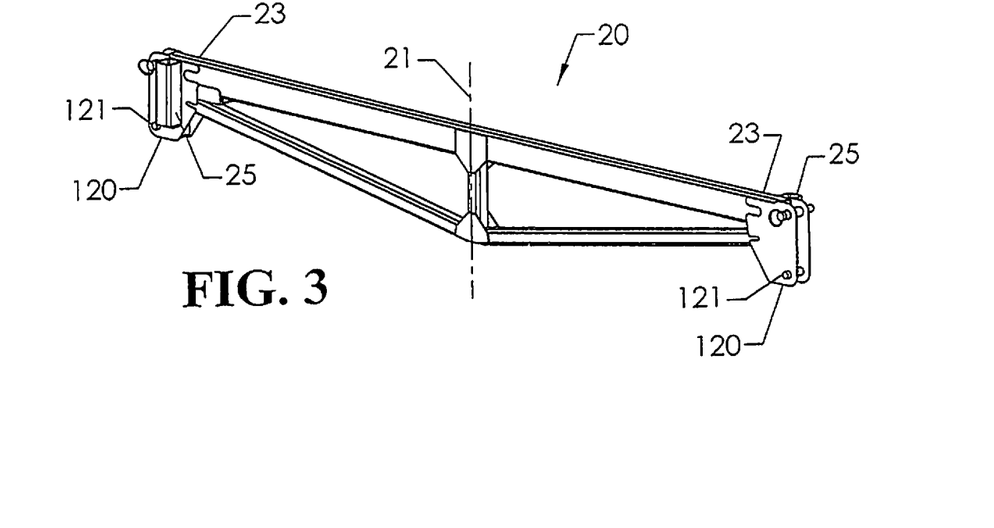
FIG. 3 is a perspective view of the beam of the rack of FIG. 1.

As seen in FIG. 3, the modular beams 20 are preferably trusses so as to afford a high strength-to-weight ratio. The beam 20 is oppositely symmetrical about its vertical center 21. That is, proximate the front and rear ends 23 of the beam 20, vertical tubular receptacles or sockets 25 are welded on opposite sides of the beam 20. As seen in FIG. 2, this permits a vertical post 27 to be extended upwardly from a selected end, or from each end, of the beam 20. Usually, the post 27 will be positioned to limit the rearwardmost roll of the sticks of pipe P on the beam 20 and prevent discharge of a stick of pipe P from the rear of the beam 20, as seen in FIG. 1.

The Legs

Figures 5A, 5B, 6:
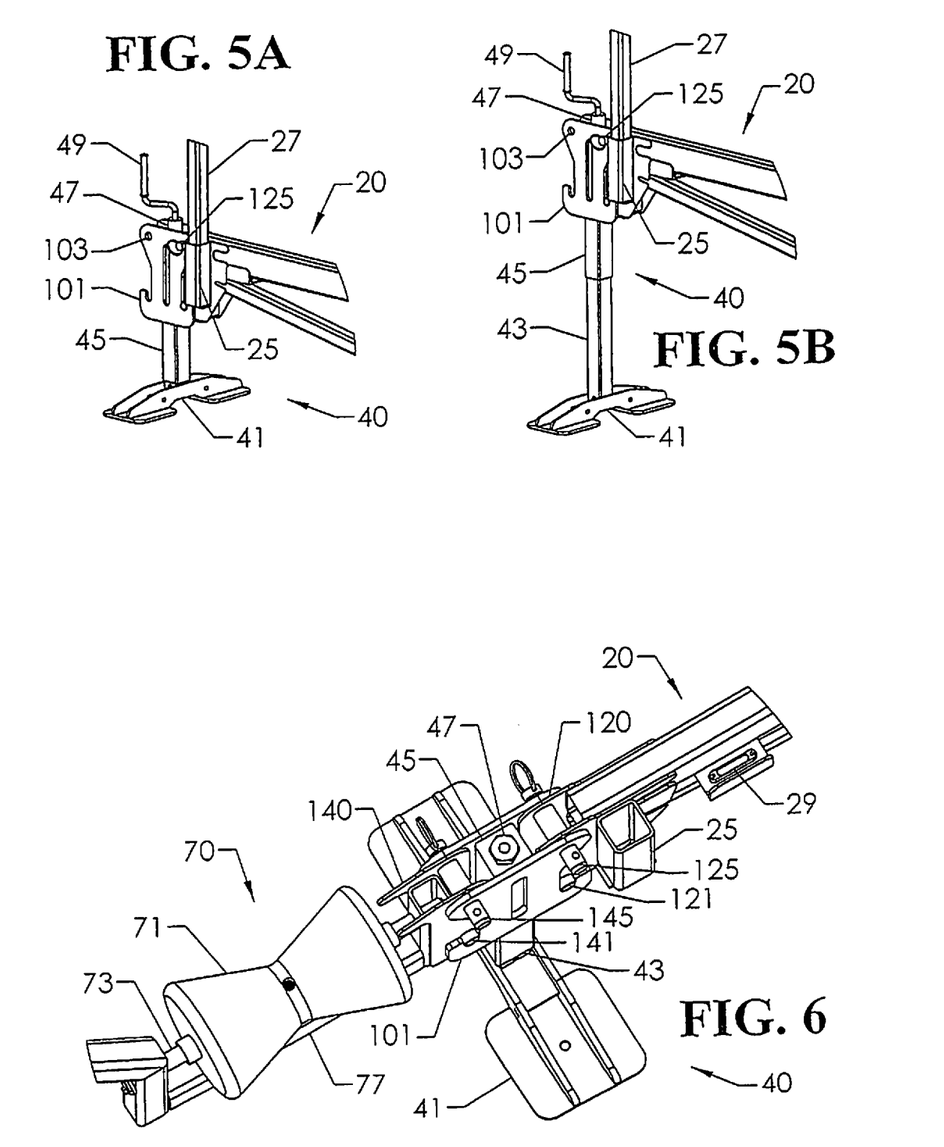
FIGS. 5A and 5B are perspective views of the junction of the beam and rear leg of the rack of FIG. 2 showing the leg in lowered and raised positions, respectively.
FIG. 6 is a perspective view of the junction of the beam, front leg and roller assembly of the rack of FIG. 2.

The legs 40 support the beam 20 above the ground. They are preferably positioned proximate front and rear ends 23 of the beam 20. As seen in FIGS. 5A and 5B, each leg 40 has a foot 41 and an upright 43. Preferably, each leg 40 has a telescoping upright extension 45 driven by a jack such as the screw jack 47 with a detachable handle 49, by a hydraulic jack or by a similar device. The jack 47 is used to vary the height of the leg 40 to orient the beam 20 on a slope at which the transverse sticks of pipe P tend to roll toward a lower front end 23 of the beam 20. Preferably, each leg 40 has a jack 47 so that the beam level will be easily coordinated with the levels of other beams 20 when multiple feeders 10 are positioned on irregular terrain. As best seen in FIG. 6, a visible level 29, such as a tubular spirit level, may be fixed to the beam 20 to facilitate setting the slope of the beam 20. The slope is set to incline the beam 20 slightly downwardly towards the roller assembly 70 to aid in loading the next stick of pipe P onto the roller assembly 70. The jacks 40 also facilitate raising and lowering the overall level of the beam 20 of the pipe stand to a proper height for feeding a stick of pipe P into the fusion machine (not shown). Thus the same feeder 10 can be used for different pipe diameters and for different sizes of fusion machines. The jacks 40 also permit the feeder 10 to accommodate varying terrain levels at the fusion machine and the racks.

The Roller Assembly

Looking at FIGS. 2 and 3, the lower front end 23 of the beam 20 has a roller assembly 70 with a roller 71 aligned for rotation on an axle 73 parallel to the beam 20. The roller 71 of each roller assembly 70 is preferably V-tapered, as shown, to assure stability of the stick of pipe P on the roller 71. A member 75 may be fixed to the roller assembly 70 forward of the roller 71 to block forward discharge of a stick of pipe P from the roller 71. The blocking member 75 may, as shown, be forwardly upwardly angled from a yoke 77 supporting the roller axle 73. Cast aluminum pipe rollers 71 are preferred.

Figure 7A:
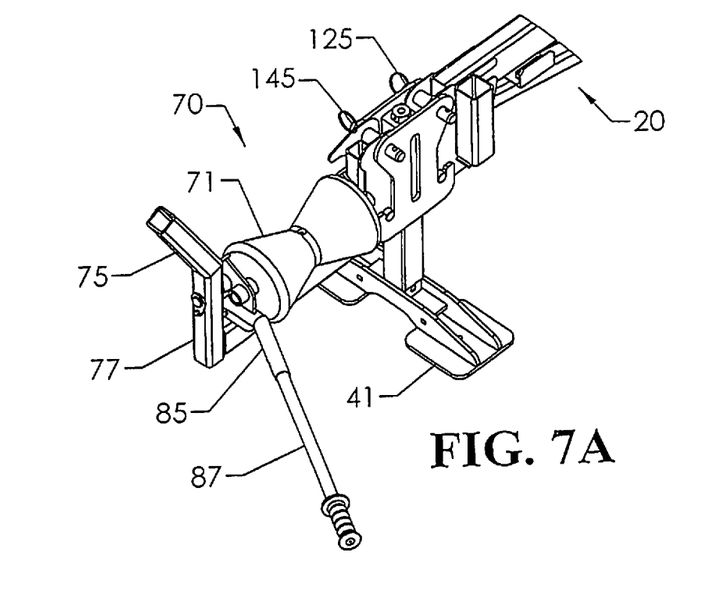
FIG. 7A is a perspective view of a roller assembly lift mechanism.
Figure 7B:
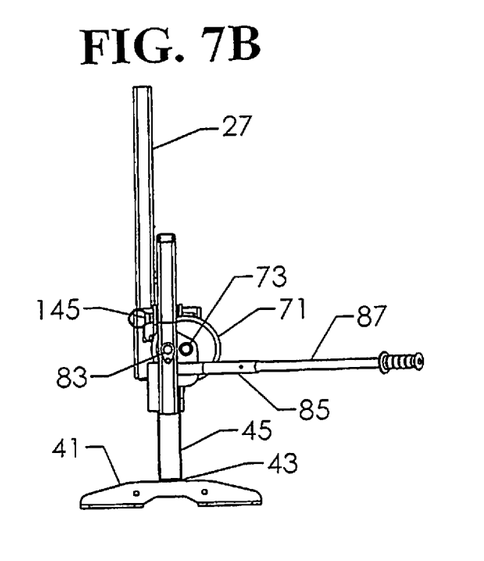
FIGS. 7B and 7C are front elevation views illustrating the normal and lift positions of the mechanism of FIG. 7A.
Figure 7C:
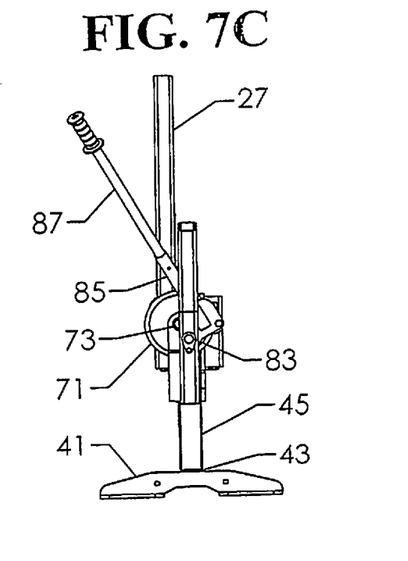

As seen in FIGS. 7A-7C, the roller assembly 70 of the feeder 10 closest to the fusion machine (not shown) may be specially adapted to facilitate feeding the leading end of the stick of pipe P into the machine. This is accomplished by mounting the roller axle 73 eccentrically from the yoke 77 which rotates on a split axle 83. An L-shaped lever 85 is fixed to the split axle 83 and a handle 87 is insertable into the lever 85. As best seen in FIG. 7A, it is preferred to employ two levers 85, one to the front and one to the rear of the roller 71. With the roller axle 73 in a normal eccentric position to the right of the split axle 83 as shown in FIG. 7B, rotation of the handle 87 in a counter-clockwise direction rotates the roller axle 73 about the split axle 83 arcuately upwardly and to the left, slightly raising the leading end of the stick of pipe (not shown) above the fusion machine jaw serrations so that the stick of pipe P can be easily pulled through jaws for proper alignment for next fusion. The over center style lift mechanism affords an approximately 14:1 mechanical lifting advantage with the handle 87 installed. Alternatively, other types of mechanical linkages and/or cams can be used to position the lead end of the stick of pipe P in relation to the fusion machine.

The Couplings

Figure 4:
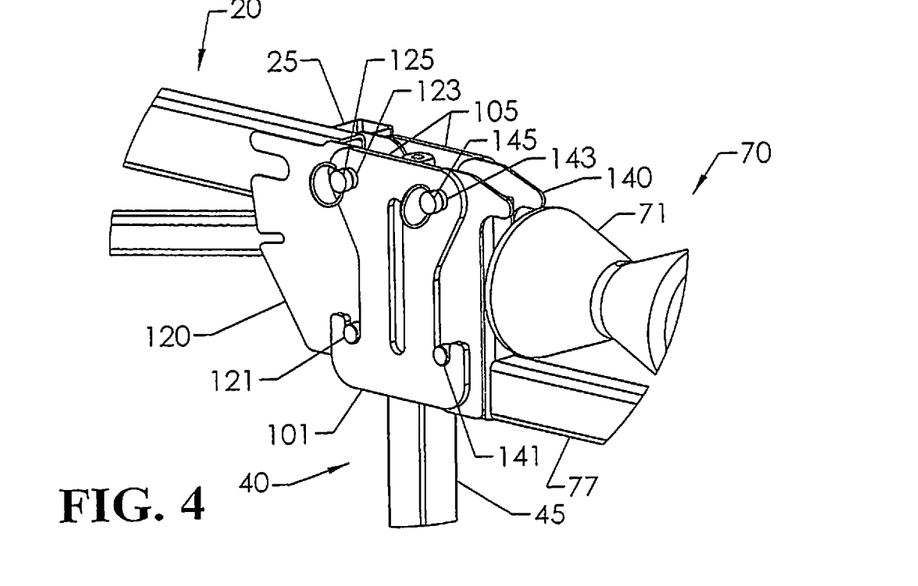
FIG. 4 is a perspective view of the junction of the beam, front leg and roller assembly of the rack of FIG. 2.

As best seen in FIGS. 4-6, a preferred leg coupling assembly 100 has an integral pair of J-hooks 101 aligned back-to-back on a vertical axis of symmetry. Each hook 101 has an upper aperture 103 through it. The coupling assemblies 120 and 140 on the beam 20 and roller assembly 70 are substantially the same in configuration. They each have an extending fixed lower pin 121 or 141 which can be seated in the bottom of its respective one of the J-hooks 101, an upper aperture 123 or 143 oriented for alignment with the aperture 103 of their respective one of the J-hooks 101 when the lower pin 121 or 141 is seated in its respective J-hook 101 and a pin 125 or 145 which is manually insertable into and withdrawable from aligned ones of the apertures 103 and 123 or 143 to lock the leg 40 to the beam 20 and the roller assembly 70 to the front leg 40.

Most preferably and as shown, each leg coupling assembly 100 has a pair of spaced apart plates 105 so that one end of the beam 20 and one side of the roller assembly 70 can be inserted between the plates 105 on opposite sides of the leg 40. Each plate 105 has an integral pair of apertured J-hooks 101 aligned back-to-back on a vertical axis of symmetry. The beam and roller assembly coupling assemblies 120 and 140 each have axially aligned pairs of fixed pins 121 or 141 and upper apertures 123 or 143 for engagement with their respective J-hooks 101. A single pin 125 or 145 can be inserted through pairs of aligned apertures 103, 123 or 143, 123 or 143 and 103 to lock its leg 40 to its respective beam 20 or roller assembly 70.

Hydraulic Embodiment

Figure 8A:
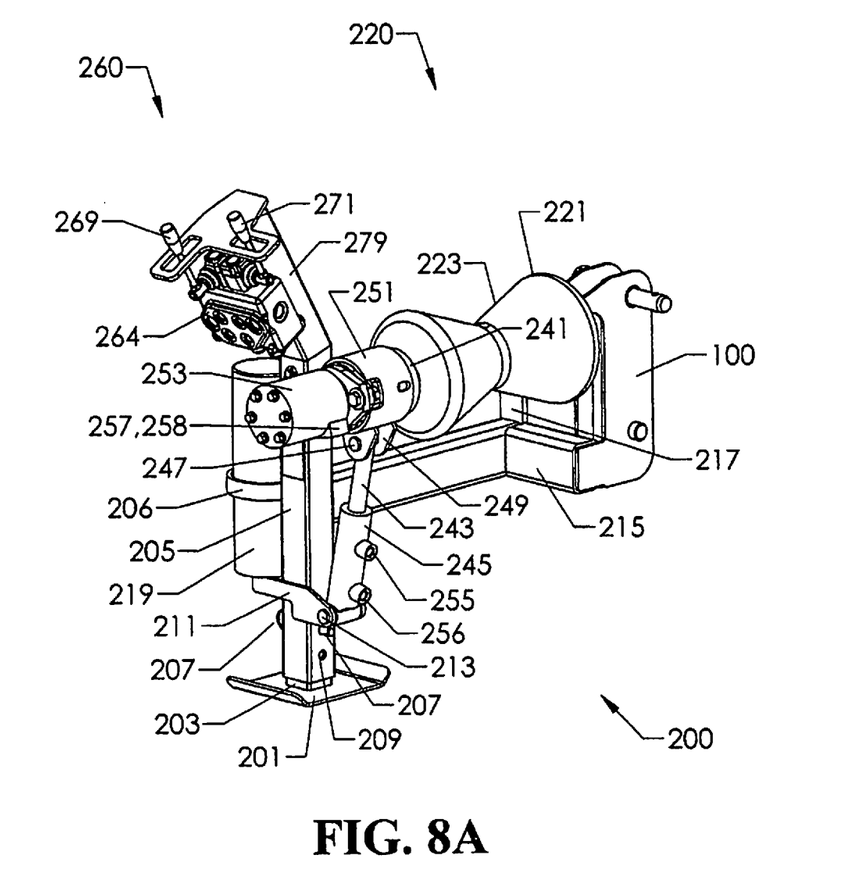
FIGS. 8A, 8B and 8C are perspective views of a hydraulic embodiment of the front leg and roller assembly.
Figure 8B:
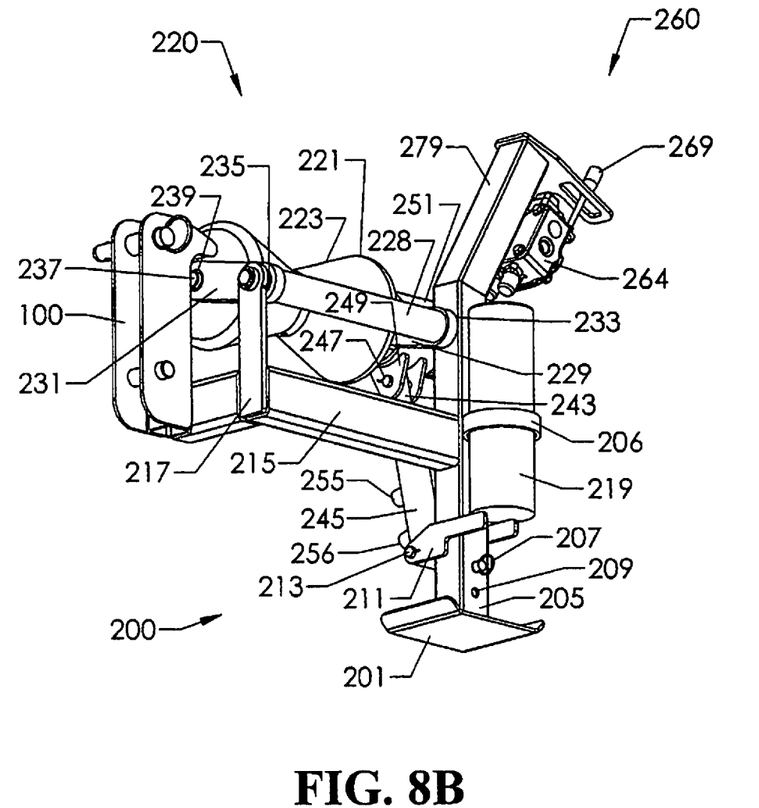
Figure 8C:
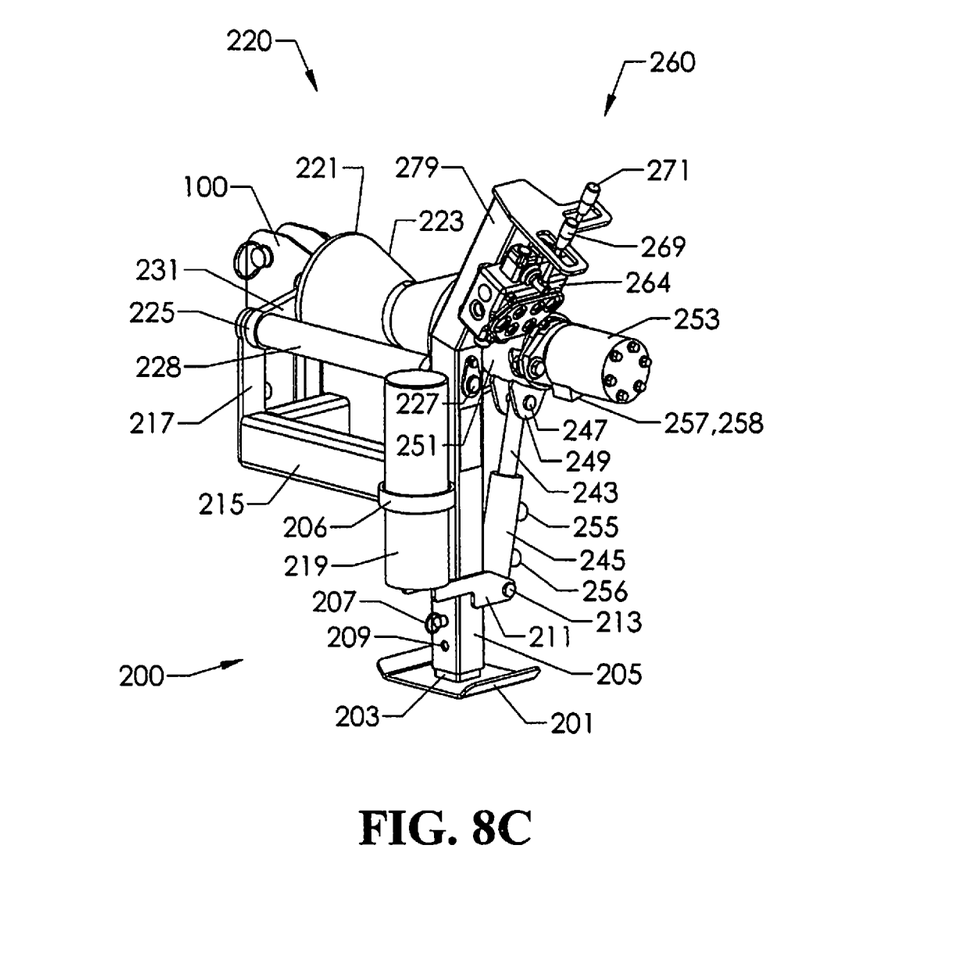

Turning to FIGS. 8A, 8B and 8C, a hydraulic embodiment of a front leg 200 and roller assembly 220 of the pipe rack is illustrated.

The leg 200 supports the beam 20 above the ground. It has a foot 201 and an upright 203. Preferably, and as shown, the upright 203 supports a telescoping tubular extension 205 which can be manually raised and lowered to adjust the height of the leg 200. The leg 200 can be locked at a selected height by insertion of a pin 207 into aligned apertures 209 in the upright 203 and telescoping extension 205 when the desired height is set. A clevis 211 is welded to a lower portion of the telescoping extension 205 to support a clevis pin 213. A horizontal L-shaped frame 215 of tubular members is welded at one end to and extends away from the telescoping extension 205 at a point above the clevis 211. The frame 215 extends from the telescoping extension 205 in a direction parallel to the clevis pin 213 and then turns in the same direction as the clevis 211 extends from the telescoping extension 205. A post 217 extends upwardly from the apex of the L-shaped frame 215.

The roller assembly 220 has a roller 221 which is journalled for rotation about its longitudinal axis. The roller 221 has a contour 223, preferably V-tapered, to align a pipe P resting on the roller 221 for lengthwise travel in a direction transverse to the axis of roller 221. A yoke 225 has a shaft 227 and a pair of radial arms 229 and 231. The shaft 227 extends through a pipe section 228 and is journalled at its ends in bearings 233 and 235 at the upper ends of the telescoping extension 205 and the post 217, respectively. The yoke shaft 227 is parallel to the clevis pin 213 and, as shown, substantially horizontal. The roller shaft 237 is journalled in bearings 239 and 241 in the yoke arms 229 and 231 at a radial distance from the horizontal axis of the yoke shaft 227. A piston 243 and cylinder 245 are pivotally connected between the clevis pin 213 on the telescoping extension 205 of the frame and the clevis pin 247 of another clevis 249 mounted on a housing 251 welded to the arm 229 of the yoke 225 adjacent to the hydraulic motor 253.

The L-shaped frame 215 has the leg 200 at one end and has a coupling assembly 100 as described in relation to FIGS. 4-6 at its other end for connection to the pipe discharge end of the storage rack. The roller 221 is oriented to receive and support a pipe P rolling off the pipe discharge end of the storage rack as seen in FIG. 1 and is contoured to align the pipe P received on the roller 221 for lengthwise travel in a direction transverse to the roller rotational axis. The piston 243 and cylinder 245 are hydraulically actuated to pivot the yoke 225 up and down so as to orient the pipe P for entry into the pipe intake opening of the fusion machine (not shown). The roller shaft 227 is driven by a reversible hydraulic motor 253 to cause the pipe P resting on the roller 221 to travel toward or away from the pipe intake opening of the fusion machine (not shown).

Figure 9:
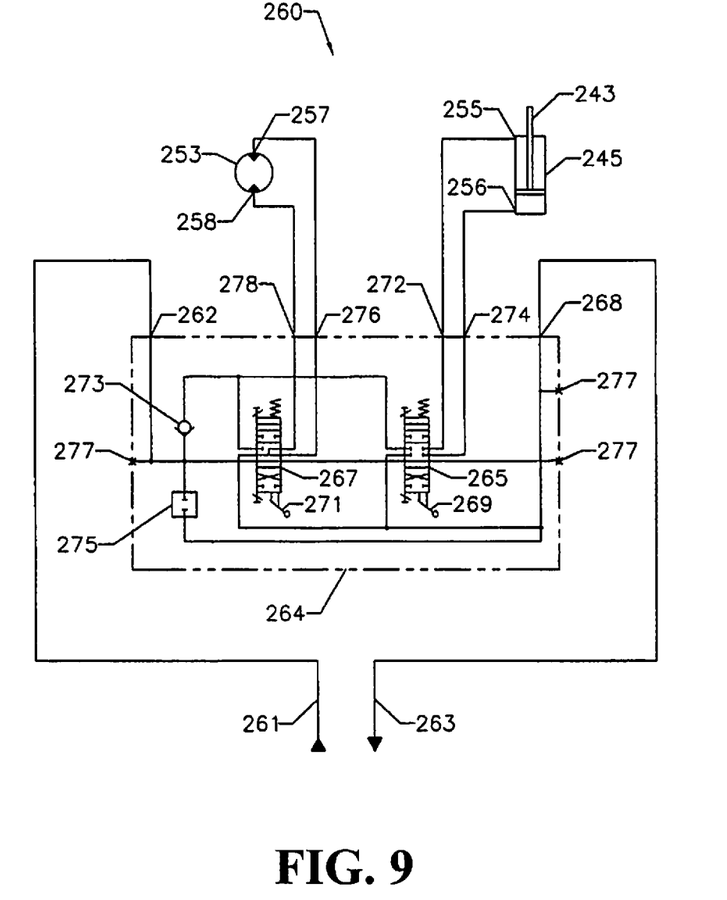
FIG. 9 is a schematic diagram of the hydraulic system of the hydraulic embodiment of FIGS. 8A, 8B and 8C.

Preferably, the hydraulic source for the pipe level adjusting piston 243 and cylinder 245 and for the pipe travel roller motor 253 are the same, most preferably the hydraulic source of the pipe fusion machine. As seen in FIG. 9, a single hydraulic control system 260 can be used. As shown, inlet and outlet lines 261 and 263 of the system 260 are connected to the fusion machine hydraulics (not shown). A two spool valve 264 has sections 265 and 267 operated by separate valve hand levers 269 and 271 for the lift cylinder 245 and roller motor 253, respectively. As shown, the hydraulic input line 261 is connected through the valve inlet port 262 and a check valve 273 to the valve sections 265 and 267. The valve sections 265 and 267 are connected through the valve outlet port 268 to the hydraulic return line 263. The valve ports 272 and 274 of the lift cylinder valve section 265 are connected to the lift cylinder ports 255 and 256, respectively, and the valve ports 276 and 278 of the roller motor valve section 267 are connected to the motor ports 257 and 258, respectively. As shown, a standard two spool valve 264 is adapted for the purpose of this system 260 by use of a closed valve plug 275 and by plugging the unused ports 277 of the valve 264.

Returning to FIGS. 8A-C, the hydraulic control system 260 is mounted on the member 279 which is welded to and extends forwardly and upwardly from the top of the telescoping extension 205. Thus, the angled member 279 also serves as a block to forward discharge of a stick of pipe P from the roller 221, as hereinbefore seen in relation to FIGS. 2 and 3.

Operation

Returning to FIG. 1, multiple independent feeders 10, usually three, are assembled with a roller assembly 70 at the front end of the beam 20 and a vertical post 27 at the rear end of the beam 20. The feeders 10 are aligned to support a traversing plurality of sticks of pipe P. The heights of the beams 20 are adjusted by use of the jacks 47 to position their rollers 71 to support a received stick of pipe P at a level coordinated to the operation of the fusion machine (not shown) and with the beams 20 on slopes which extend upwardly from their rollers 71 at angles at which said sticks of pipe P tend to roll toward the rollers 71. Preferably, loading is accomplished by resting one or more strapped bundles of sticks of pipe P on the beams 20 and then cutting the straps. A loaded stick of pipe P is then manually urged to roll down the beam slopes onto the rollers 71. The end of the loaded stick of pipe P closest to the fusion machine can be raised slightly, if necessary, using the lever 85 and handle 87, to raise the stick of pipe P above the level of the fusion machine. The raised stick of pipe P can be easily pushed into the fusion area of the machine and then lowered to the fusion machine height. After the leading end of the manually rolled stick of pipe P is fused to the trailing end of the pipeline, the pipeline can be pulled until the trailing end of the fused stick of pipe P is positioned for fusion by the fusion machine to the next stick of pipe P. The operation is then repeated beginning with the step of manually urging a loaded stick of pipe P to roll down the beam slopes onto the rollers 71.

If a hydraulic embodiment of the front leg 220 and roller assembly 240 is used at the pipe discharge end of the closest feeder 10 to the pipe fusion machine (not shown), the pin 207 is used to lock the telescoping tubular extension 205 of the leg 200 so as to prevent the weight of the pipe P on the roller 221 as closely as possible to the height-wise alignment with the pipe intake opening of the fusion machine (not shown) to guard against tipping of the roller assembly 240 by the weight of the pipe P. The roller motor valve lever 271 is operated in forward or reverse positions to advance or withdraw the pipe P toward or from the fusion machine pipe intake opening. The operator can exert slight downward manual pressure on the pipe P against the roller 221 as necessary to assist the travel of the pipe P. As the pipe P draws close to the opening, if the pipe P is not properly elevated to align with the intake opening of the fusion machine, the roller motor lever 271 is returned to a neutral condition and the lift cylinder valve lever 269 is operated in up or down positions to raise or lower the pipe P to align with the fusion machine pipe intake opening. Once aligned, the lift cylinder lever 269 is returned to a neutral condition and the roller motor valve lever 271 again operated in forward position to advance the pipe P into the fusion machine pipe intake opening. As seen in FIGS. 8A-C, a ring 206 is welded to the telescoping extension 205 above the clevis 211. A canister 219 which slides into the ring 206 and seats on the clevis 211 can be used to store the operating instructions for the hydraulic system.

Using the modular system herein described, multiple beams 20 can be serially connected by legs 40 to afford an extended length beam sloped from one end to the other. Furthermore, roller assemblies 70 can be connected at each end of such an extended beam so that a single beam system can be used to serve two separate fusion machines, one on either side of the feeder.

Thus, it is apparent that there has been provided, in accordance with the invention, a rack-type pipe feeder that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in feeding sticks of pipe into a pipe fusion machine having jaws configured to receive a stick of pipe along a longitudinally horizontal axis, a pipeline assembly system comprising:
   at least two rollers contoured and positioned to support a pipe stick at rest thereon in alignment with a longitudinally horizontal axis;
   an axle of a one of said at least two rollers being eccentrically mounted on a pivoting yoke; and
   means for pivoting said yoke to hydraulically raise and lower said axle with a leading portion of the pipe stick at rest on said one of said at least two rollers to realign the leading portion of the pipe stick in relation to said longitudinally horizontal axis.

2. A pipeline assembly system according to claim 1, said means for pivoting said yoke comprising:
   a piston and cylinder connected between pivotal joints on a frame and said pivoting yoke; and
   means for actuating said piston and cylinder to pivot said yoke only while the leading portion of the pipe stick is at rest on said one of said at least two rollers.

3. A pipeline assembly system according to claim 2 further comprising means for de-actuating said piston and cylinder and means for driving rotation of said one of said at least two rollers to cause the pipe stick to advance on said rollers only while said piston and cylinder are de-actuated.

4. A pipe handler according to claim 3, said means for driving rotation of said one of said at least two rollers comprising a hydraulic motor.

* * * * *